(No Model.)

A. McLEAN & F. CUMMING.
WATER FILTER.

No. 346,304. Patented July 27, 1886.

Witnesses,
Geo. H. Strong.
J. L. Nourse.

Inventors,
Anthony McLean
Findlay Cumming
By Dewey & Co.
atty

UNITED STATES PATENT OFFICE.

ANTHONY McLEAN AND FINDLAY CUMMING, OF SAN FRANCISCO, CAL.

WATER-FILTER.

SPECIFICATION forming part of Letters Patent No. 346,304, dated July 27, 1886.

Application filed April 26, 1886. Serial No. 200,222. (No model.)

*To all whom it may concern:*

Be it known that we, ANTHONY MCLEAN and FINDLAY CUMMING, both of the city and county of San Francisco, State of California, have invented an Improvement in Water-Filters; and we hereby declare the following to be a full, clear, and exact description of the same.

Our invention relates to a filter to be attached to ordinary pipes or faucets, for the purpose of cleansing water to be used for household or other purposes from the larger and heavier impurities. It consists of an exterior transparent casing and an interior cylindrical column, the sides of which are formed of filtering material, and having a central discharge-aperture through the bottom. The upper end is screw-threaded, and in combination with that is a shank extending upwardly so as to enter the mouth of the faucet, and having connected with it an eccentric, corrugated, or other suitable locking device, by which it is held to the faucet while it is screwed to place, a joint being made by a suitable elastic packing at the top of the outer casing.

Figure 1:
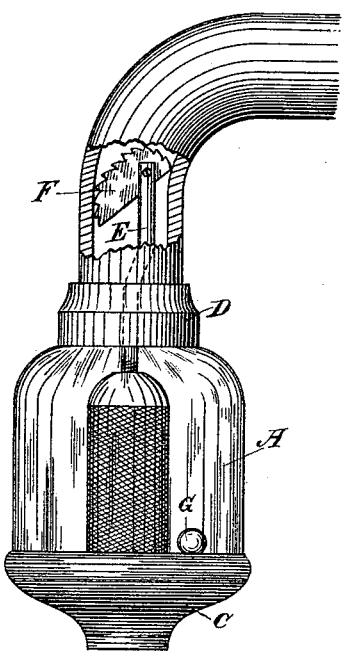
Figure 2:
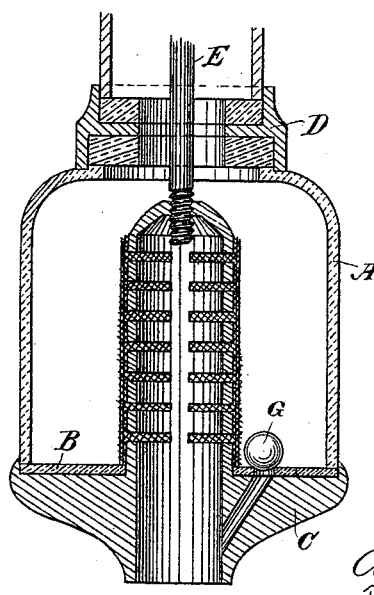

Referring to the accompanying drawings for a more complete explanation of our invention, Figure 1 is a view of the filter, showing its attachment to the faucet. Fig. 2 is a vertical section showing the interior construction.

A is the exterior portion of the filter, which is preferably made of glass, and may be of any suitable shape. In the present case we have shown it in the form of a small bell-glass, the lower edge of which rests upon an elastic or rubber packing, B, which is placed in the metallic base C. The upper end of the upper casing, A, which is also open, has a collar, D, fitted to it and provided with a rubber or elastic packing, which makes a tight joint upon the upper end. These parts are all loose and removable, when not in connection with the faucet, but are attached together and to the faucet in a manner to be hereinafter described.

Through the center of the base C a discharge-opening is made, and a central open-sided frame-work is cast or formed with the base extending upward within the outer casing, A, nearly to its top. The open sides of this central portion are surrounded by one or more layers of fine wire-gauze or other suitable filtering material, which extends from the base nearly to the top, within the outer casing, as shown. The upper end of this central column has a hole with screw-threads cut to receive the lower end of the shank E, which screws into it. This shank extends upward through the top of the casing to a suitable distance, and is preferably bent to one side, as shown. The upper end is vertically slotted or otherwise constructed to receive a semicircular cam-shaped or other irregular plate, F, which is pivoted to the upper end of the shank E, so as to turn freely about the pivot. Its outer surface or edge is preferably toothed or corrugated, so that it will bind and hold securely when inserted in the faucet.

When it is desired to attach the filter to the faucet, the shank is screwed into the hollow central stand of the filter one or two turns, and its upper end is then introduced into the faucet, the toothed plate hanging down in such a manner as to allow it to be readily inserted. When it has been inserted, the edge of the plate is pressed against the side of the faucet and the filter drawn slightly backward, which causes the plate to rotate and bind in the faucet. The filter is then turned around until it is screwed up on the shank so as to bring the packing in the upper part of the collar D into close contact with the lower end of the faucet, thus making a perfectly-tight joint, and at the same time pressing the plate C at the bottom against the lower edge of the glass casing and the packing upon the lower part of the collar upon the top of the casing, so that the whole is perfectly tight. Water being then admitted, will flow through the central screen and pass upward through the opening in the base, being thus deprived of its impurities, so as to clear the water sufficiently for use.

In order to cleanse the filter without removing it from the faucet, a hole is made in the base-piece C at one side of the central filtering-column, and this hole connects with the central discharge-aperture below the bottom of the column. G is a small ball, which will ordinarily rest upon the top of the hole, and will thus keep it closed perfectly tight, the flow of water in the filter always forcing it into place as soon as the first rush is past and the flow becomes steady. If it is desired to cleanse the filter, by striking it slightly upon one side the jar will be sufficient to force the ball away from the hole, and the water will then rush through the outer casing, cleansing it from all impurities which are discharged from this hole after passing through the filter. The exterior surface of the filtering-column will thus be cleansed of the impurities which may have attached to it. As soon as the device is left to itself, the ball will again find its way into position, so as to stop the hole.

The whole device is easily made, all parts easily separated for inspection or cleansing, and its attachment to any faucet is very readily accomplished.

Having thus described our invention, what we claim as new, and desire to secure by Letters Patent, is—

1. A filter composed of the exterior casing and a base, and having a central discharge-opening, with a standard or column projecting upward from this opening within the case and formed of or provided with the filtering material, an opening in the top of the case, through which water is admitted around the filtering-column, in combination with a screw-shank extending upward through said opening, and having an eccentric or cam plate pivoted to its upper end, so as to engage the interior of the faucet and hold the filter in place when screwed up, substantially as herein described.

2. A device for attaching the filter to the faucet, consisting of a shank having a cam or eccentric plate pivoted to its upper end, which enters the faucet, and its lower end provided with screw-threads, upon which the filter may be screwed until it comes in contact with the mouth of the faucet, whereby the cam will be held in contact with the interior of the faucet, substantially as herein described.

3. A filter composed of the exterior casing and base having a central opening, through which water is discharged, a central screen or filtering-column extending upward from this opening toward the top of the case, which is open to admit water around the column, and provided with a device by which it is secured to the faucet, in combination with the discharge-opening extending from the interior of the case outside of the filtering-column, and a ball or valve by which said opening is closed, substantially as herein described.

4. A filter having a transparent or glass exterior case and metallic base, with the packing upon which the bottom of the case rests, a central discharge-opening, and an interior filtering column attached to the base, a loose collar with packing-rings fitting the top of the cylinder, and a shank screwing into the top of the filtering-column, having a cam or eccentric pivoted in its upper end by which it is connected with the faucet, and a screw by which the parts of the filter are held together and against the mouth of the faucet, substantially as herein described.

In witness whereof we have hereunto set our hands.

ANTHONY McLEAN.
FINDLAY CUMMING.

Witnesses:
S. H. NOURSE,
H. C. LEE.